(12) United States Patent
Jackl et al.

(10) Patent No.: US 12,728,820 B2
(45) Date of Patent: Sep. 8, 2026

(54) AIR CLEANING DEVICE

(71) Applicant: ZKW Group GmbH, Wieselburg (AT)

(72) Inventors: Christian Jackl, Wieselburg (AT); Georg Pitterle, Kirnberg an der Mank (AT); Thomas Reiter, Ferschnitz (AT)

(73) Assignee: ZKW Group GmbH, Wieselburg (AT)

( * ) Notice: Subject to any disclaimer, the term of this patent is extended or adjusted under 35 U.S.C. 154(b) by 528 days.

(21) Appl. No.: 18/200,866

(22) Filed: May 23, 2023

(65) Prior Publication Data

US 2023/0391292 A1 Dec. 7, 2023

(30) Foreign Application Priority Data

Jun. 1, 2022 (EP) .................................... 22176667

(51) Int. Cl.
*B60S 1/60* (2006.01)
*B60S 1/54* (2006.01)

(52) U.S. Cl.
CPC ................ *B60S 1/544* (2013.01); *B60S 1/60* (2013.01)

(58) Field of Classification Search
CPC .... B60S 1/52; B60S 1/544; B60S 1/60; B60S 1/54; B60S 1/56; B60S 1/603; B08B 5/02
See application file for complete search history.

(56) References Cited

U.S. PATENT DOCUMENTS

| | | | |
|---|---|---|---|
| 5,546,630 A | 8/1996 | Long | |
| 5,657,929 A | 8/1997 | DeWitt et al. | |
| 2002/0005440 A1 | 1/2002 | Holt et al. | |
| 2018/0194328 A1* | 7/2018 | Numakunai | G03B 17/02 |
| 2023/0126082 A1* | 4/2023 | Trebouet | B60S 1/56 15/320 |

FOREIGN PATENT DOCUMENTS

WO WO-9214634 A1 * 9/1992 ................ B60S 1/56

OTHER PUBLICATIONS

Extended European Search Report in EP Application No. 22176667.8, dated Nov. 7, 2022 (6 Pages).

* cited by examiner

*Primary Examiner* — Qingzhang Zhou
*Assistant Examiner* — Joel Zhou
(74) *Attorney, Agent, or Firm* — Eversheds Sutherland (US) LLP

(57) ABSTRACT

A cleaning device for cleaning a cover lens of a vehicle headlamp is configured to generate an airstream and direct it towards the cover lens. The cleaning device includes at least one air stream device (ASD) configured to generate at least one airstream in an airflow direction. Each ASD includes an air chamber having a spreading section for spreading the received air, a homogenization section for homogenizing the spread air, and a nozzle for outputting the received air in the airflow direction and forming the respective airstream. The spreading section includes a guide channel configured to spread the received air transversely to the airflow direction and to guide the received air to the homogenization section. The ASD is formed by: (i) a main component including parts of each of the spreading section, homogenization section, and nozzle of the air chamber of each ASD, (ii) a separation component including parts of the spreading section and nozzle, wherein the separation and main components form the spreading section of each ASD, and (iii) a cover component including parts of the homogenization portion and nozzle, wherein the cover, main, and separation components form the homogenization section and the nozzle of the ASD.

12 Claims, 2 Drawing Sheets

AIR CLEANING DEVICE

CROSS-REFERENCE TO RELATED APPLICATIONS

This application claims priority to European Patent Application No. 22176667.8, filed Jun. 1, 2022, which is incorporated herein by reference.

FIELD OF THE INVENTION AND DESCRIPTION OF PRIOR ART

The invention relates to a cleaning device for cleaning a cover lens of a vehicle headlamp, wherein the cleaning device is configured to generate at least one airstream and to direct the airstream towards the cover lens.

The invention further relates to a vehicle headlamp comprising a cover lens and at least one cleaning device according to the invention.

Modern vehicle headlamps often comprise also optical sensors for detecting the environment in front of the vehicle headlamp, which optical sensors are disposed of within the housing of the vehicle headlamp. These sensors require a clear sight through the cover lens of the vehicle headlamp.

In order to fulfill such requirements vehicle headlamps also comprise a cleaning device for cleaning the cover lens. However, cleaning devices of the prior art are usually not efficient in case only a certain area of the cover lens needs to be cleaned.

SUMMARY OF THE INVENTION

It is an object of the invention to provide an enhanced adjusting system.

To achieve this object, the cleaning device comprises:

at least one air stream device, each of which is configured to generate at least one airstream in an airflow direction, wherein each air stream device comprises:

an air chamber having an inlet for receiving air, a spreading section for spreading the received air, a homogenization section for homogenizing the spread air, and a nozzle for outputting the received air in the airflow direction and forming the respective airstream, wherein the spreading section comprises at least one guide channel from the inlet of the air chamber transversely to the airflow direction and comprises a channel output, wherein the guide channel is configured to spread the received air transversely to the airflow direction and to guide the received air to the homogenization section of the air chamber, wherein the homogenization section receives the spreading air via the separate channel output of the guide channel, wherein the homogenization section is configured to homogenize the spreading air along the nozzle of the air chamber, wherein the at least one air stream device is formed by the combination of the following components:

the main component comprising the inlet, a part of the spreading section, a part of the homogenization section, and a part of the nozzle of the air chamber of each air stream device, a separation component comprising a part of the spreading section and a part of the nozzle of each air chamber, wherein the separation component is arranged on the main component in a way that the main component in combination with the separation component form the spreading section of each air stream device, and a cover component comprising a part of the homogenization portion and a part of the nozzle of each air chamber, wherein the cover component is arranged on the separation component and the main component in a way that the cover component in combination with the main component and the separation component form the homogenization section and the nozzle of each air stream device, wherein the separation component arranged between the main component and the cover component is configured to separate the main component and the cover component in a way so that a gap extending transversely to the airflow direction between the main component and the cover component is formed, which gap defines the nozzle of each air chamber.

Advantageously, the main component is built as a separate part or is made as an integral piece with the cover lens.

Moreover, the cleaning device advantageously can also comprise a separate water cleaning system, which is not included in the air stream devices, which assists the cover lens cleaning.

Advantageously, the cleaning device comprises a detection system for detecting contamination (e.g. dust or dirt) on the cover lens, wherein when contamination is detected by the detection device, only the air stream devices which airstream reaches the area of contamination is activated to clean the cover lens in this area.

Advantageously, the cleaning device comprises at least two air stream devices.

Advantageously, the spreading section of the at least one air stream device comprises at least two guide channels branching from the inlet of the air chamber transversely to the airflow direction and each guide channel comprise a separate channel output, wherein the guide channels are configured to spread the received air transversely to the airflow direction and to guide the received air to the homogenization section of the air chamber.

Advantageously, the separation component is built as a foil having a thickness, wherein the thickness of the foil defines the gap of the nozzle of each air chamber.

Advantageously, the foil has a thickness in a range of 30 to 70 μm, preferably a thickness of 50 μm.

Advantageously, the foil is built of a plastic material.

Advantageously, the main component has an abutment portion, wherein the separation component is disposed of on the abutment portion of the main component.

Advantageously, the air stream devices are separated by a bridge consisting of a part of the main component and the separation component.

Advantageously, the air stream devices are independently controllable, preferably controllable by a control device.

Advantageously, the air stream devices are activated one by one starting from the first air stream device, wherein the next adjacent air stream device is activated with a time offset.

Advantageously, the spreading section of the air chamber of each air stream device comprises exactly two guide channels.

The object is also achieved by a vehicle headlamp comprising a cover lens and at least one cleaning device according to the invention.

Advantageously, the at least one cleaning device is arranged in a way that the airflow direction of the airstreams has an upward course seen in a correct installed state of the vehicle headlamp in a vehicle. Such a course is beneficial when the cleaning device is installed in a driving vehicle.

It is also possible that the airflow direction of the airstreams has a downward or side to side course seen in a correct installed state of the vehicle headlamp in a vehicle.

BRIEF DESCRIPTION OF THE DRAWINGS

In the following, in order to further demonstrate the present invention, illustrative and non-restrictive embodiments are discussed, as shown in the drawings, which show.

DETAILED DESCRIPTION OF EMBODIMENTS OF THE INVENTION

Figure 1:
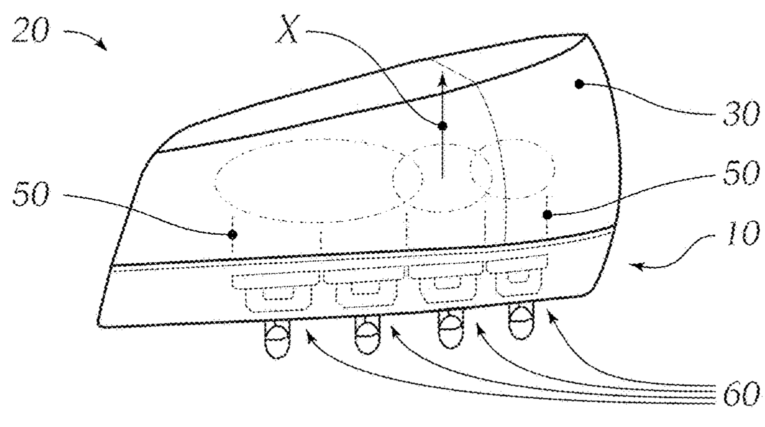
FIG. 1 a perspective view of a vehicle headlamp comprising a cover lens and a cleaning device, which is configured to generate airstreams and to direct the airstream to the cover lens, wherein the cleaning device comprises air stream devices which are built by the main component, a separating component and a cover component, FIG. 2A the main component of the cleaning device in FIG. 1, FIG. 2B the main component of FIG. 2A together with the separation component arranged on the main component, FIG. 2C the main component and separation component of FIG. 2B and the cover component, which is arranged on the main component and the separation component.

FIG. 1 shows a vehicle headlamp 20 comprising a cover lens 30 and a cleaning device 10, wherein the cleaning device 10 is configured to clean the cover lens 30 of the vehicle headlamp wherein the cleaning device 10 is arranged in a way that the airflow direction X of the airstreams 50 having an upward course seen in a correct installed state of the vehicle headlamp 20 in a vehicle.

The cleaning device 10 is configured to generate at least one airstream 50 and to direct the airstream 50 towards the cover lens 30, wherein the cleaning device 10 comprises air stream devices 60, each of which is configured to generate one airstream 50 in an airflow direction X. The air stream devices 60 are independently controllable, preferably controllable by a control device.

Figure 3:
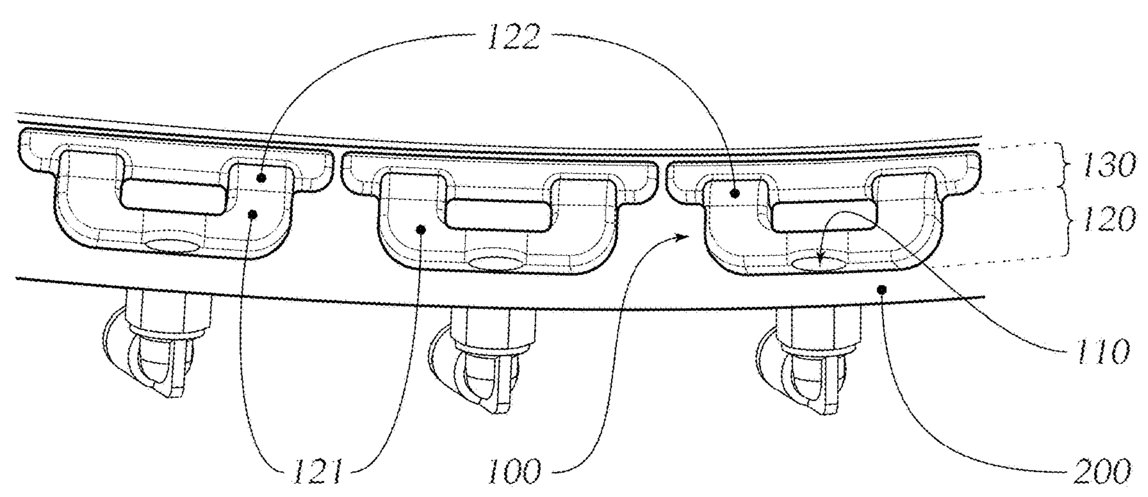
FIG. 3 is a detailed view of the main component, which comprises an inlet, a part of a spreading section, a part of a homogenization section and a part of a nozzle of an air chamber of each air stream device, and FIG. 4 a schematic cross-section view of the cleaning device shown in FIG. 2C.

Each air stream device 60 comprises an air chamber 100 having an inlet 110 for receiving air, a spreading section 120 for spreading the received air, a homogenization section 130 for homogenizing the spreading air, and a nozzle 140 for outputting the received air in the airflow direction X and forming the respective airstream 50—which can be seen for example in FIG. 3.

Each spreading section 120 comprises in the shown example two guide channels 121 branching from the inlet 110 of the air chamber 100 transversely to the airflow direction X and each guide channel 121 comprise a separate channel output 122, wherein the guide channels 121 are configured to spread the received air transversely to the airflow direction X and to guide the received air to the homogenization section 130 of the air chamber 100.

The homogenization section 130 receives the spreading air via the separate channel output 122 of the guide channels 121, wherein the homogenization section 130 is configured to homogenize the spreading air along the nozzle 140 of the air chamber 100.

The air stream devices 60 are formed by the combination of a main component 200, a separation component 300, and a cover component 400.

Figure 2A:
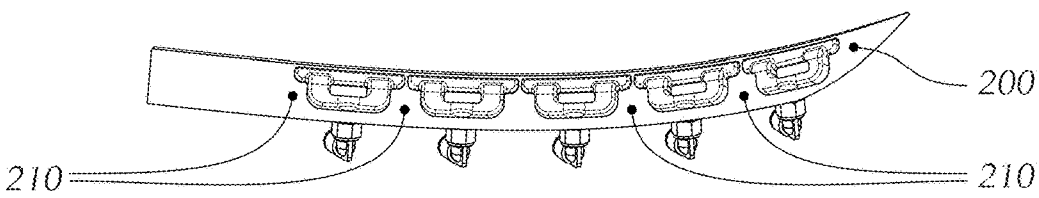

The main component 200 comprising the inlet 110, a part of the spreading section 120, a part of the homogenization section 130, and a part of the nozzle 140 of the air chamber 100 of each air stream device 60. FIG. 2A shows the main component 200 and the parts of the main component.

Figure 2B:
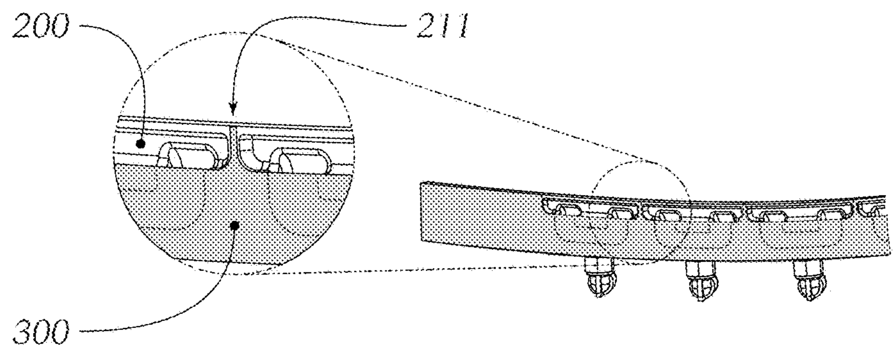

The separation component 300 comprising a part of the spreading section 120 and a part of the nozzle 140 of each air chamber 100, wherein the separation component 300 is arranged on the main component 200 in a way that the main component 200 in combination with the separation component 300 form the spreading section 120 of each air stream device 60. FIG. 2B shows the separation component 300 arranged on the main component of FIG. 2A.

Figure 2C:
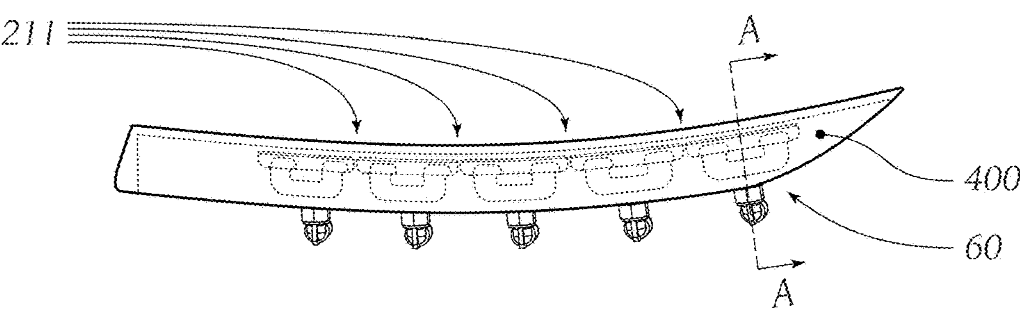

The cover component 400 comprising a part of the homogenization portion 130 and a part of the nozzle 140 of each air chamber 100, wherein the cover component 400 is arranged on the separation component 300 and the main component 200 in a way that the cover component 400 in combination with the main component 200 and the separation component 300 form the homogenization section 130 and the nozzle 140 of each air stream device 60. FIG. 2C shows the cover component 400 arranged on the main component 200 and the separation component 300.

The separation component 300 is arranged between the main component 200 and the cover component 400 is configured to separate the main component 200 and the cover component 400 in a way so that a gap extending transversely to the airflow direction X between the main component 200 and the cover component 400 is formed, which gap defines the nozzle 140 of each air chamber 100.

In other words, the air stream devices 60 are separated by a bridge 211 consisting of a part of the main component 200 and the separation component 300.

Figure 4:
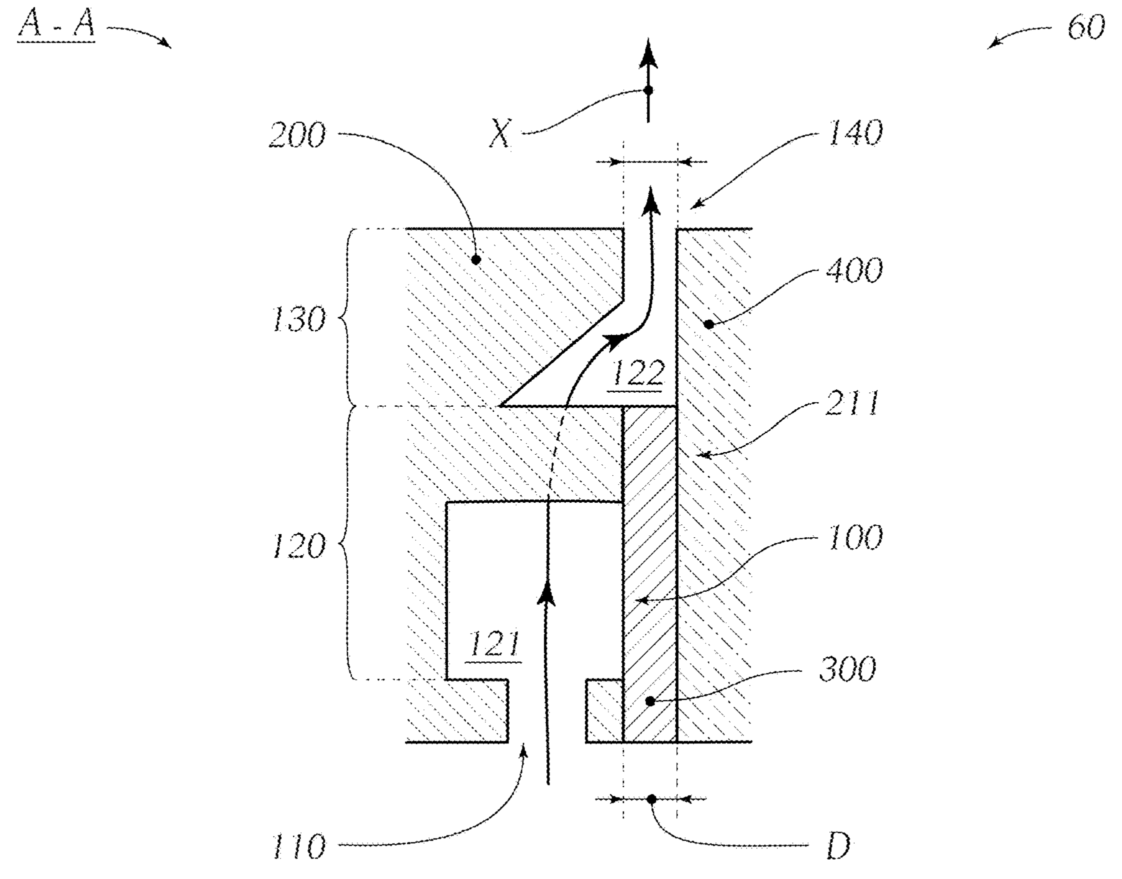

A better overview of the arranged components 200, 300, and 400 together is shown in FIG. 4, which shows a cross-section of these components in FIG. 2C.

In the shown example in the figures, the separation component 300 is built as a foil having a thickness D, wherein the thickness D of the foil defines the gap of the nozzle 140 of each air chamber 100, wherein the foil having a thickness D in a range of 30 to 70 μm, preferably a thickness D of 50 μm. The foil may be built of a plastic material.

Further, the main component 200 has an abutment portion 210 (which can be seen for example in FIG. 2A), wherein the separation component 300 is disposed on the abutment portion 210 of the main component 200.

Further, the air stream devices 60 may be activated one by one starting from the first air stream device 60, wherein the next adjacent air stream device 60 is activated with a time offset.

LIST OF REFERENCE SIGNS

| | |
|---|---|
| Cleaning device . . . | 10 |
| Vehicle headlamp . . . | 20 |
| Cover lens .. . | 30 |
| Airstream . . . | 50 |
| Air stream device . . . | 60 |
| Air chamber . . . | 100 |
| Inlet . . . | 110 |
| Spreading section . . . | 120 |
| Guide channel . . . | 121 |
| Channel output . . . | 122 |

-continued

| LIST OF REFERENCE SIGNS | |
|---|---|
| Homogenization section . . . | 130 |
| Nozzle . . . | 140 |
| Main component . . . | 200 |
| Abutment portion . . . | 210 |
| Bridge . . . | 211 |
| Separation component . . . | 300 |
| Cover component . . . | 400 |
| Thickness . . . | D |
| Airflow direction . . . | X |

The invention claimed is:

1. A cleaning device (10) for cleaning a cover lens (30) of a vehicle headlamp (20), wherein the cleaning device (10) is configured to generate at least one airstream (50) and to direct the airstream (50) towards the cover lens (30), wherein the cleaning device (10) comprises:

at least one air stream device (60), each of which is configured to generate at least one airstream (50) in an airflow direction (X), wherein each air stream device (60) comprises:

an air chamber (100) having an inlet (110) for receiving air, a spreading section (120) for spreading the received air, a homogenization section (130), and a nozzle (140) for outputting the received air in the airflow direction (X) and forming the respective airstream (50), wherein the spreading section (120) comprises at least one guide channel (121) from the inlet (110) of the air chamber (100) transversely to the airflow direction (X) and comprises a channel output (122), wherein the guide channel (121) is configured to spread the received air transversely to the airflow direction (X) and to guide the received air to the homogenization section (130) of the air chamber (100), wherein the homogenization section (130) is configured to receive the spreading air via the separate channel output (122) of the guide channel (121) and to provide that the spreading air is uniform along the nozzle (140) of the air chamber (100), wherein the at least one air stream device (60) is formed by the combination of the following components:

a main component (200) comprising the inlet (110), a part of the spreading section (120), a part of the homogenization section (130), and a part of the nozzle (140) of the air chamber (100) of each air stream device (60), a separation component (300) comprising a part of the spreading section (120) and a part of the nozzle (140) of each air chamber (100), wherein the separation component (300) is arranged on the main component (200) in a way that the main component (200) in combination with the separation component (300) form the spreading section (120) of each air stream device (60), and a cover component (400) comprising a part of the homogenization portion (130) and a part of the nozzle (140) of each air chamber (100), wherein the cover component (400) is arranged on the separation component (300) and the main component (200) in a way that the cover component (400) in combination with the main component (200) and the separation component (300) form the homogenization section (130) and the nozzle (140) of each air stream device (60), wherein the separation component (300) arranged between the main component (200) and the cover component (400) is configured to separate the main component (200) and the cover component (400) in a way so that a gap extending transversely to the airflow direction (X) between the main component (200) and the cover component (400) is formed, which gap defines the nozzle (140) of each air chamber (100), and wherein the main component (200) has an abutment portion (210), wherein the separation component (300) is disposed on the abutment portion (210) of the main component (200), wherein the at least one air stream device (60) is separated by a bridge (211) consisting of a part of the main component (200) and the separation component (300).

2. The cleaning device according to claim 1, wherein the cleaning device (10) comprises at least two air stream devices (60).

3. The cleaning device according to claim 1, wherein the spreading section (120) of the at least one air stream device (60) comprises at least two guide channels (121) branching from the inlet (110) of the air chamber (100) transversely to the airflow direction (X) and each guide channel (121) comprise a separate channel output (122), wherein the guide channels (121) are configured to spread the received air transversely to the airflow direction (X) and to guide the received air to the homogenization section (130) of the air chamber (100).

4. The cleaning device according to claim 1, wherein the separation component (300) is built as a foil having a thickness (D), wherein the thickness (D) of the foil defines the gap of the nozzle (140) of each air chamber (100).

5. The cleaning device according to claim 4, wherein the foil has a thickness (D) in a range of 30 μm to 70 μm.

6. The cleaning device according to claim 4, wherein the foil is built of a plastic material.

7. The cleaning device according to claim 1, wherein the at least one air stream device (60) comprises at least two air stream devices, which are independently controllable.

8. The cleaning device according to claim 7, wherein the at least two air stream devices (60) are configured to be activated one by one starting from a first air stream device (60), wherein the next adjacent air stream device (60) is activatable with a time offset.

9. The cleaning device according to claim 1, wherein the spreading section (120) of the air chamber (100) of each air stream device (60) comprises exactly two guide channels (121).

10. A vehicle headlamp (20) comprising a cover lens (30) and at least one cleaning device (10) according to claim 1.

11. The vehicle headlamp according to claim 10, wherein the at least one cleaning device (10) is arranged in a way that the airflow direction (X) of the airstreams (50) having an upward course seen in an installed state of the vehicle headlamp (20) in a vehicle.

12. The cleaning device according to claim 5, wherein the foil has a thickness (D) of 50 μm.

* * * * *